Figure 1:
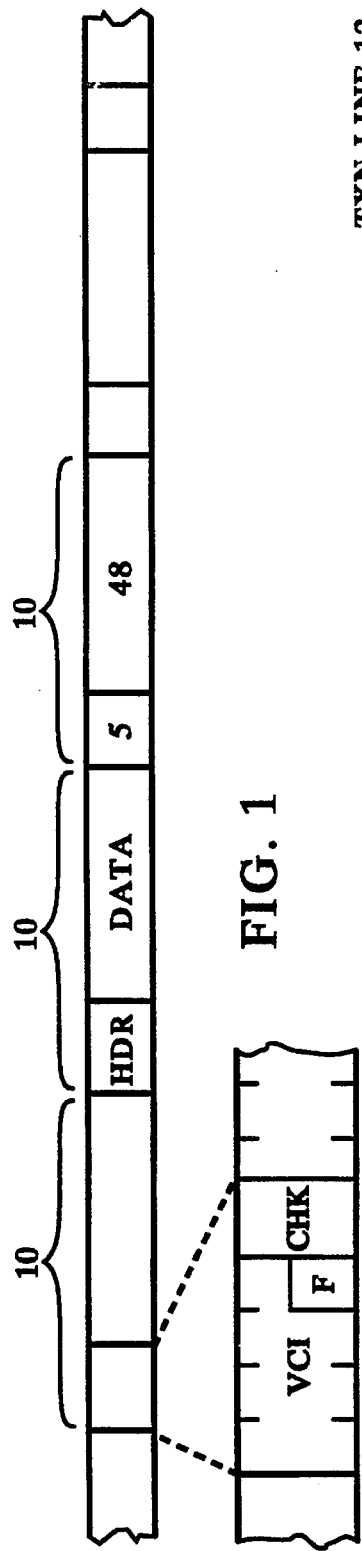

United States Patent [19]

Higginson et al.

[11] Patent Number: 5,610,951
[45] Date of Patent: Mar. 11, 1997

[54] EFFICIENT ATM CELL SYNCHRONIZATION

[75] Inventors: Peter L. Higginson, Herts; Anthony N. Berent, Hampshire, both of United Kingdom

[73] Assignee: Digital Equipment Corporation, Maynard, Mass.

[21] Appl. No.: 73,220

[22] Filed: Jun. 4, 1993

[30] Foreign Application Priority Data

Jun. 23, 1992 [GB] United Kingdom .................... 9213273

[51] Int. Cl.$^6$ ........................................................ H04L 7/06
[52] U.S. Cl. .......................... 375/364; 345/368; 370/514; 371/42
[58] Field of Search .................... 375/113, 116, 375/114; 370/105.4, 102

[56] References Cited

U.S. PATENT DOCUMENTS

| | | | |
|---|---|---|---|
| 3,982,074 | 9/1976 | Clark | 179/15 BV |
| 4,016,548 | 4/1977 | Law et al. | |
| 4,594,708 | 6/1986 | Servel et al. | 370/94 |
| 4,922,438 | 5/1990 | Ballweg | 370/85.15 |
| 4,947,388 | 8/1990 | Kuwahara et al. | 370/60 |
| 4,962,498 | 10/1990 | May, Jr. | 370/94.1 |
| 5,054,020 | 10/1991 | Meagher | 370/48 |
| 5,123,013 | 6/1992 | Hirayama | 370/105.4 |
| 5,155,487 | 10/1992 | Tanaka et al. | 341/100 |
| 5,189,666 | 2/1993 | Kagawa | 370/94.1 |
| 5,193,088 | 3/1993 | Choi et al. | 370/60 |
| 5,251,215 | 10/1993 | Dravida et al. | 370/99 |
| 5,282,215 | 1/1994 | Hyodo et al. | 371/42 |

FOREIGN PATENT DOCUMENTS 0264064  4/1988  European Pat. Off. ....... H03M 13/00

OTHER PUBLICATIONS

Kitami, "Synchronization Method Employing a Cyclic Redundancy Check in an Asynchronous Transport System"; Electronics and Communications in Japan vol. 73, No. 5, May 1990, New York US pp. 99–108.

Patent Abstracts of Japan, vol. 1, No. 1312 (E–548) Oct. 1987.

Patent Abstracts of Japan, No. 9106 (E–313) May 1985.

*Primary Examiner*—Stephen Chin
*Assistant Examiner*—T. Ghebretinsae
*Attorney, Agent, or Firm*—Christine M. Kuta

[57] ABSTRACT

A device 11 includes a sync unit 20 to identify and achieve synchronization with the cell boundaries of a 53-byte ATM cell stream. Each cell starts with a 5-byte header in which the 5th byte is a CRC byte. Instead of testing all possible bytes to see whether they are cell boundaries, a CRC circuit 21 computes CRCs for successive 5-byte blocks, under the control of a 5-state header counter 22. If such a block is a header, its CRC is a predetermined value, and a match signal is sent to a logic circuit 23, which starts a 53-state cell counter 24 and stops the header counter 22. A 4-state repeat counter 25 checks that the next 5 blocks checked by the CRC circuit 21 are also headers, as confirmation. Synchronization is achieved within at most 5 cells, because the test period of the testing circuitry (which could be longer than the header length) is coprime with the cell length.

12 Claims, 1 Drawing Sheet

EFFICIENT ATM CELL SYNCHRONIZATION

The present invention relates to synchronizing systems for achieving synchronization with cell boundaries for a fast stream of digital data in which the cell boundaries are not readily distinguishable.

In data transmission systems, particularly switching and other systems in which there are many devices between which messages may be passed, one well-established technique involves sending data as a substantially continuous stream of cells of fixed size, each cell being essentially independent of the other cells.

A particular example of this technique is known as ATM (Asynchronous Transmission Mode). If a device wants to send a message which is too long to fit into a single cell, it has to send a suitable number of separate cells. (The term "asynchronous" is used because the cells carrying the message appear at irregular intervals in the cell stream, interleaved with similarly irregularly spaced groups of cells to and from other devices.) ATM systems are generally designed as high speed systems, typically carrying data at speeds of some 50 to 2000 Mbit/s.

Because the system can carry a variety of messages between different devices, the cells of the data stream must include some form of identifiers, primarily so that each destination device can recognize those cells which are directed to it (and ignore cells directed to other devices). This identification information is in the form of a header forming part of the cell. The cell format must of course be fixed for a given system; there is in fact a standard cell format, in which the cell consists of 48 data bytes preceded by a 5-byte header, with the header consisting of 4 bytes of control information (eg a 28-bit logical channel number plus 4 flag bits) plus a single CRC check byte (formed from the 4 header information bytes).

Each of the devices to which the cell stream is fed has to identify the cell boundaries; that is, it has to achieve synchronization with the cell stream. If the data is transmitted as a stream of bytes, this involves determining the first byte of each cell; if the data is transmitted as a serial stream of bit combinations smaller than a byte (eg a serial bit stream of a stream of nibbles (half-bytes)), then this involves determining the byte boundaries as well. We shall assume for the most part that the data stream is a byte wide.

The defined procedure for detecting cell boundaries consists (for the standard cell format described above) of testing every possible block of 5 bytes to determine whether it is a header; that is, whether the 5th byte of the block is a valid CRC check for the preceding 4 bytes. If this test is satisfied, then a cell header has been successfully identified. The following 48 bytes are the data bytes of the cell, and succeeding cells in the stream are identified by dividing the following byte stream into successive 53-byte blocks.

The test consists of calculating a CRC for the entire potential header, including the 5th byte, and determining whether the result is a predetermined value. This 5th byte is the CRC in the header, which was originally calculated from the first 4 bytes when the header was being constructed. The properties of CRCs are such that if the calculation is carried on to the 5th byte gives a predetermined result.

If the data stream is serial by bits or nibbles, then the test is essentially the same, but involves testing every possible block of 5 bytes, ie every possible block of 40 bits or 10 nibbles. This detects byte boundaries simultaneously with cell boundaries.

It is possible for a random 5-byte block to satisfy the test for a header by chance. Given random bytes, the chance of the value of the 5th byte following 4 bytes being by chance a valid CRC for those 4 bytes is 1 in 256. Once a putative header has been found, therefore, the headers of a suitable number of immediately following putative cells are also tested. If the headers of these putative cells also satisfy the test, then synchronization is regarded as having been achieved.

(The testing can in fact be continued permanently even after synchronization has been achieved. If the test should fail, that is taken as indicating a loss of synchronization, and synchronization is initiated again.)

This synchronization procedure is reasonably straightforward, and involves no problems in principle. Its practical implementation, however, can present considerable practical difficulties. The speeds noted above correspond to bit periods of 20 to 0.5 ns, and byte periods of 160 to 4 ns. Although the calculation of a CRC is reasonably straightforward (eg by table look-up), it cannot be achieved instantaneously. More seriously, to test each possible candidate block of 5 bytes will generally require 5 sets of test circuits in staggered operation, and the timing requirements on the control circuitry required to control these test circuits and monitor their outputs properly are severe.

We have realized that these difficulties can be largely obviated by a different approach.

The crux of the present invention lies in providing a single test circuit which tests non-overlapping but substantially contiguous blocks of data signals, with the blocks being chosen at a spacing which is effectively coprime with the cell length.

More formally, the present invention provides synchronizing apparatus for identifying cell boundaries in a stream of data signals, each cell starting with a header including a CRC, the apparatus comprising a single CRC check circuit and timing means which select, for testing by the CRC check circuit, non-overlapping but substantially contiguous blocks of signals, with the blocks being chosen at a spacing which is effectively coprime with the cell length.

In the preferred arrangement, which operates on 5+48 byte cells, the test circuit operates in a 5-byte period and tests successive 5-byte blocks. (It is convenient to give the length of the cell as two components, the number of header bytes and the number of data bytes.) Since 5 and 53 (ie 5+48) are coprime, the 5-byte blocks will occupy all possible positions in turn in the actual cells, and one of them must eventually coincide with an actual header.

For this, the test circuit preferably computes the CRC check during the 5 bytes, and produces the match signal (if there is a match) at the end of the 5th byte period. (This is generally feasible.) If there is no match, then the test circuitry immediately begins another test, starting with the next following byte. This will achieve synchronization within at most 5 cells.

If desired, the test circuit may take more than 5 byte periods to perform its test; say, for example 7. Since 7 and 53 are coprime, this will also achieve synchronization (within at most 7 bytes). Since 53 is in fact prime, it is therefore coprime with all possible numbers of periods which the test circuit may take, and synchronization will therefore always be achieved for this cell size.

If the cell length is not prime, then not all test circuit periods will work, but in practice it will always be possible to choose a test circuit period which is only slightly larger than the header length. For example, if the cell size is 8+48, then the test circuit period must be at least 8 (it must be at least as long as the header length). This minimum value of 8 will not achieve synchronization, as it is a factor of the cell length, 56. However, if it is increased by 1 to 9, then it is coprime with 56, and will achieve synchronization. A test circuit period of 10 will not work, because 10 and 56 have a common factor (2), and in fact any even test circuit period will not work; but all reasonable odd periods will work.

If the cell length is not prime, then a modification of the system as described so far can be used to achieve synchronization with a test period length which is not coprime with the cell length. This consists of periodically increasing the test period length. Thus for a cell size of 5+55, a test period of 5 has a common factor with the cell length of 60. In fact, 12 test period cycles fit exactly in a cell length. If one of these cycles is increased by 1 to 6, then the length of 12 test circuit periods is 61, which is coprime with the cell length, and the synchronization will eventually be achieved.

It is convenient to increase one test circuit period by 1 once every cell cycle. This can be achieved by using the cell length counter (which is invariably present in the synchronization circuitry). If this counter is allowed to run freely while the synchronization circuitry is trying to achieve synchronization, the interval between successive tests by the test circuitry can be increased by 1 byte period each time the cell length counter cycles.

It will however generally be easier to choose a test circuit period which is coprime with the cell length without having to use the technique of the last two paragraphs.

If the data stream is serial by bits or nibbles, then the cell length will be 40+384 bits or 10+96 nibbles. The same principles apply, so that for the serial bit case, for example, a test circuit period of any odd number of bit cycles from 41 to 51 is acceptable. A test period of 40 bit cycles is also acceptable if an extra 1 bit cycle is inserted into the sequence of tests once every cell period.

It will be realized that the present technique is not limited to ATM systems, but can be used in a variety of situations where synchronization is required.

For such more general situations, an alternative technique is known. That known technique arises from a system for maintaining synchronization once it has been achieved, by testing the start of each cell for the properly boundary conditions to confirm that synchronization is indeed being maintained. For certain types of cell boundary, it is relatively easy to arrange for that testing to slip by 1 byte per cell until synchronization is achieved.

In effect, the principle which the present technique utilizes is this. If a potential division of the bytes into cells is defined arbitrarily, then (sticking with our 53-byte cells for convenience) the actual cell boundary can occupy any one of the 53 positions within the potential cells so defined. By testing all these positions, one after the other, in a systematic way, the true cell boundary must eventually be located.

This known system may not be readily applicable to the detection of all types of cell boundary. However, even where it is applicable, the time it takes to achieve synchronization will typically be an order of magnitude larger than the present technique (53 cells as compared to 5 in our preferred example).

Figure 2:
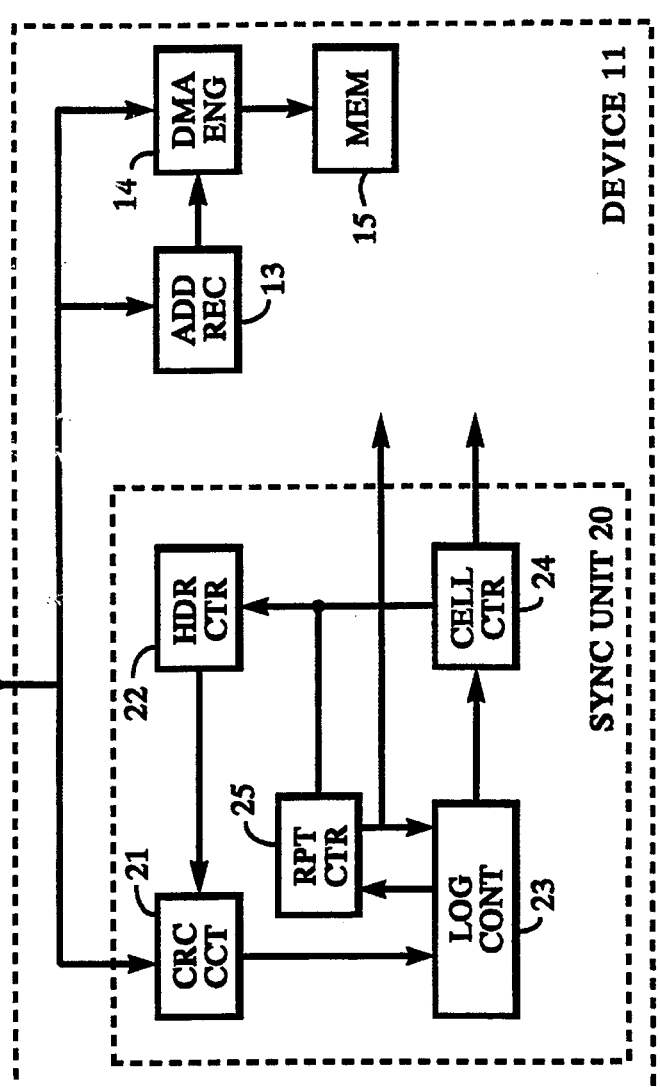

A device embodying the invention will now be described, by way of example, with reference to the drawings, in which:

FIG. 1 shows the structure of a data stream, and
FIG. 2 is a block diagram of the device.

It will be understood that the diagram is highly simplified and shows only the main components concerned with synchronization.

Referring to FIG. 1, the stream of data consists of a continuous stream of bytes which are divided into 53-byte cells 10. Each cell is divided into a 5-byte header HDR and a 48-byte data section DATA. The header is turn is subdivided into a 3-byte virtual circuit identifier VCI, a -byte flags section F, and a 1-byte check section CHK.

The cells are generated by source devices (not shown), each cell being essentially independent. For each cell, its source device generates the source and destination addresses, and computes the contents of the check section as a CRC (cyclic redundancy check) for the first 4 bytes of the header. The contents of the data section are essentially random as far as the present invention is concerned.

FIG. 2 shows a device 11 coupled to a transmission medium 12 which carries a data stream of the type shown in FIG. 1. The device 11 may for example be a memory device which stores cells addressed to it. The device 11 contains an address recognition circuit 13 to which the transmission medium 12 is coupled and which detects a match between the destination address in an incoming cell and the device£s own address. The data stream is fed to a DMA engine 14 which operates as a memory control circuit coupled to a memory 15. Circuit 13 enables the DMA engine 14 for cells addressed to the device 12, so that the data contents of those cells are stored in the memory 15.

For this device to operate correctly, the operation of its various components (including in particular the units 13 and 14) must be synchronized with the cell boundaries in the data stream. This is achieved by a synchronizing unit 20.

The unit 20 includes a CRC circuit 21 which is fed from the transmission line 12. Circuit 21 is controlled by a 5-state header counter 22 which counts in step with the bytes on line 12. During the 5 counts of the header counter, CRC circuit 21 computes the CRC of the full 5 bytes on line 12 which appear during those counts. If the 5 bytes are a true header, with the 5th byte being a CRC for the first 4 bytes, the CRC of the entire 5 bytes will be a predetermined value, as explained above.

The header counter 22 is initially free-running and cyclic, and therefore causes the CRC circuit 21 to check contiguous 5-byte blocks, starting at some random byte. Generally there will be several such blocks for which the computed CRC does not equal the proper value. Eventually, however, this proper value will occur, and the CRC circuit will then send a match signal to a control logic unit 23.

A 53-state cell counter 24 is initially held at count 5 by a disable signal from the logic unit 23. When this logic unit receives the match signal from the CRC circuit, it turns off this disable signal, allowing the cell counter 24 to start counting cyclically (in step with the bytes on line 12, like the header counter 22). The device 11 takes counter as defining the cells of the data stream of line 12; specifically, it takes counts 0 to 4 as defining the header section of a cell, and counts 5 to 52 as defining the data section of the cell already passed.)

Once the header counter 22 has started to count from the initial count of 5, it automatically cycles thereafter. However, it only starts it counting on the count of 48 from cell counter 24. Once the cell counter has counted beyond 5, when the header counter cycles back to 0 it then sticks at that count (0) until the count of the cell counter reaches the count of 5, when the header counter starts to count again. So once the CRC circuit 21 has produced a match signal, cell counter 24 starts running, and header counter 22 runs through its 5 counts at the end of each data section as measured by the cell counter 24, ie at counts 0 to 4 of the cell counter.

As discussed above, it is possible for a random group of 5 bytes to falsely satisfy the CRC check. A repeat counter 25 is therefore provided, the number of states of this counter being the number of successive putative headers which must satisfy the CRC test before the system accepts them as true headers; 4 states is a convenient number. This counter counts up from 0 each time the cell counter 24 passes through count 0, and is reset to 0 immediately if the CRC circuit 21 fails to produce a match signal.

The repeat counter 25 therefore starts to count once the cell counter has started to count. (In fact, counter 25 does not advance until the cell counter has completed its cycle and passes through 0; also, the cell counter starts from count 5 for its first cycle.)

Provided that the putative header identified by a match signal from the CRC circuit 21 is a true header, the CRC circuit will continue to produce match signals for each cycle of the cell counter 24. The repeat counter will therefore reach its maximum count, count 3, after 4 cyclings of the cell counter. This count of 3 is fed to the logic circuit 23, which feeds an inhibit signal back to the repeat counter to hold it at that count. It is also fed to the rest of the device 11, signalling that synchronization with the data stream of line 12 has now been achieved (with the counts of the cell counter 24 defining the timing of those cells).

Once synchronization has been achieved, the synchronizing circuit 20 can of course continue to monitor the headers in the data stream, to detect any loss of synchronization.

It will of course be realized that many variations can be made in the details of the structure and operation of the synchronizing circuit.

We claim:

1. Synchronizing apparatus for identifying cell boundaries in a stream of data signals received from a transmission line, each cell starting with a header including a CRC, each cell having a cell length, each header having a header length, the apparatus comprising:

a single CRC check circuit and timing means which select, for testing by the CRC check circuit, non-overlapping but substantially contiguous blocks of signals, each block has a block length greater than the header length, with the blocks being chosen at a spacing which is effectively coprime with the cell length;

means for sending a match signal identifying a cell header to a control unit in response to said CRC check circuit computing from the blocks of signals a value matching a predetermined CRC value; and, means for said control unit to verify synchronization with the stream of data signals in response to said match signal.

2. Synchronizing apparatus according to claim 1 wherein the blocks are exactly contiguous.

3. Synchronizing apparatus according to claim 1 or claim 2 wherein each of the blocks has a block length, each said header has a header length, and the block length is the same as the header length.

4. Synchronizing apparatus according to claim 3 wherein the data signals are bytes, the cell length is 53 bytes, the header length is 5 bytes of which the last byte is a CRC byte, and each of the blocks has a length of 5 bytes.

5. Synchronizing apparatus for identifying cell boundaries in a stream of data signals received form a transmission line, each cell starting with a header including a CRC, each cell having a length, the apparatus comprising:

a header counter to count bytes in said stream of data signals;

a single CRC check circuit and timing means which select, for testing by the CRC check circuit, non-overlapping but substantially contiguous blocks of signals, with the blocks being chosen at a spacing which is effectively coprime with the cell length, said CRC check circuit to compute a CRC of a predetermined number of bytes as counted by said header counter;

means for sending a match signal identifying a cell header to a control unit in response to said CRC check circuit computing from said predetermined number of bytes a value matching a predetermined CRC value; and, means for said control unit to verify synchronization with the stream of data signals in response to said match signal.

6. The apparatus as in claim 5 wherein said predetermined number of bytes further comprises 5 bytes.

7. The apparatus as in claim 5 further comprising: a cell counter to count bytes in said stream of data signals; and, wherein said header counter counts said predetermined number of bytes in successive headers after said cell counter indicates a cell boundary during reception of said stream of data, and said CRC check circuit indicates whether a CRC value computed for each said successive header has said predetermined CRC value.

8. The apparatus as in claim 7 further comprising:

a repeat counter to count a predetermined number of successive headers having said CRC check circuit compute said predetermined CRC value, to enable said apparatus to accept said headers as true headers.

9. The apparatus as in claim 8 wherein said predetermined number of successive headers is 4.

10. The apparatus as in claim 8 wherein said repeat counter signals said synchronization apparatus that synchronization with said data stream has been achieved, in the event that said repeat counter counts said predetermined number of successive headers.

11. Synchronizing apparatus for identifying cell boundaries in a stream of data signals received from a transmission line, each cell starting with a header including a CRC, each cell having a length, the apparatus comprising:

a single CRC check circuit and timing means which select, for testing by the CRC check circuit, non-overlapping but substantially contiguous blocks of signals, with the blocks being chosen at a spacing which is effectively coprime with the cell length;

means for sending a match signal identifying a cell header to a control unit in response to said CRC check circuit computing from the blocks of signals a value matching a predetermined CRC value;

a cell counter to count bytes in said stream of data signals in response to said match signal, and to define a cell boundary after counting a predetermined number of cell bytes; and, means for said control unit to verify synchronization with the stream of data signals in response to said match signal and said cell boundary.

12. The apparatus as in claim 11 wherein said predetermined number of cell bytes is 54 bytes.

\* \* \* \* \*